US011623661B2

(12) United States Patent
Costea et al.

(10) Patent No.: US 11,623,661 B2
(45) Date of Patent: Apr. 11, 2023

(54) ESTIMATING GROUND HEIGHT BASED ON LIDAR DATA

(71) Applicant: Zoox, Inc., Foster City, CA (US)

(72) Inventors: Arthur Daniel Costea, San Mateo, CA (US); Robert Evan Mahieu, San Francisco, CA (US); David Pfeiffer, Foster City, CA (US); Zeng Wang, Menlo Park, CA (US)

(73) Assignee: Zoox, Inc., Foster City, CA (US)

( * ) Notice: Subject to any disclaimer, the term of this patent is extended or adjusted under 35 U.S.C. 154(b) by 193 days.

(21) Appl. No.: 17/068,425

(22) Filed: Oct. 12, 2020

(65) Prior Publication Data
US 2022/0111868 A1 Apr. 14, 2022

(51) Int. Cl.
B60W 60/00 (2020.01)
G06T 17/20 (2006.01)
(Continued)

(52) U.S. Cl.
CPC ........ B60W 60/0015 (2020.02); B60W 30/09 (2013.01); B60W 30/0956 (2013.01);
(Continued)

(58) Field of Classification Search
CPC ............. B60W 60/0015; B60W 30/09; B60W 30/0956; B60W 2554/20;
(Continued)

(56) References Cited

U.S. PATENT DOCUMENTS 10,535,138 B2    1/2020  Pfeiffer
11,227,401 B1*   1/2022  Mahieu .................. G01S 17/89
(Continued)

FOREIGN PATENT DOCUMENTS

WO    WO2019241022 A1    12/2019

OTHER PUBLICATIONS

Liang, Ming, et al. "Multi-task multi-sensor fusion for 3d object detection." Proceedings of the IEEE Conference on Computer Vision and Pattern Recognition. Jun. 2019, 9 pgs.
(Continued)

Primary Examiner — Peter D Nolan
Assistant Examiner — Kenneth M Dunne
(74) Attorney, Agent, or Firm — Lee & Hayes, P.C.

(57) ABSTRACT

Techniques for controlling a vehicle based on height data and/or classification data being determined utilizing multi-channel image data are discussed herein. The vehicle can capture lidar data as it traverses an environment. The lidar data can be associated with a voxel space as three-dimensional data. Semantic information can be determined and associated with the lidar data and/or the three-dimensional voxel space. A multi-channel input image can be determined based on the three-dimensional voxel space and input into a machine learned (ML) model. The ML model can output data to determine height data and/or classification data associated with a ground surface of the environment. The height data and/or classification data can be utilized to determine a mesh associated with the ground surface. The mesh can be used to control the vehicle and/or determine additional objects proximate the vehicle.

20 Claims, 5 Drawing Sheets

(51) Int. Cl.
  *G06K 9/62* (2022.01)
  *G06V 20/56* (2022.01)
  *G08G 1/16* (2006.01)
  *B60W 30/095* (2012.01)
  *B60W 30/09* (2012.01)

(52) U.S. Cl.
  CPC ............ *G06K 9/6268* (2013.01); *G06T 17/20* (2013.01); *G06V 20/56* (2022.01); *B60W 2420/52* (2013.01); *B60W 2554/20* (2020.02); *B60W 2554/404* (2020.02); *B60W 2554/4029* (2020.02); *G08G 1/165* (2013.01); *G08G 1/166* (2013.01)

(58) Field of Classification Search
  CPC ... B60W 2554/4029; B60W 2554/404; B60W 2420/52; G06V 20/56; G06K 9/6268; G06T 17/20; G08G 1/165; G08G 1/166
  See application file for complete search history.

(56) References Cited

U.S. PATENT DOCUMENTS

| | | | |
|---|---|---|---|
| 2018/0364717 A1* | 12/2018 | Douillard | G05D 1/024 |
| 2019/0026958 A1* | 1/2019 | Gausebeck | G06T 7/521 |
| 2019/0258737 A1* | 8/2019 | Wang | G06V 20/56 |
| 2019/0278292 A1* | 9/2019 | Levinson | G05D 1/024 |
| 2019/0384309 A1* | 12/2019 | Silva | G01S 17/931 |
| 2020/0025935 A1* | 1/2020 | Liang | G06V 10/803 |
| 2020/0098135 A1* | 3/2020 | Ganjineh | G06T 7/74 |
| 2020/0110158 A1* | 4/2020 | Ecins | G05D 1/024 |
| 2020/0110416 A1* | 4/2020 | Hong | G01C 21/3602 |
| 2020/0160559 A1* | 5/2020 | Urtasun | G01S 17/86 |
| 2021/0063578 A1* | 3/2021 | Wekel | G06K 9/6288 |
| 2021/0342600 A1* | 11/2021 | Westmacott | G06V 20/56 |
| 2022/0024485 A1* | 1/2022 | Theverapperuma | G06K 9/6257 |
| 2022/0083807 A1* | 3/2022 | Zhang | G06V 10/774 |

OTHER PUBLICATIONS

Ronneberger et al.. "U-net: Convolutional networks for biomedical image segmentation." International Conference on Medical image computing and computer-assisted intervention, Nov. 2015, 8 pgs.
The International Search Report and Written Opinion for PCT Application No. PCT/US21/53965, dated Jan. 13, 2022, 9 pgs.

* cited by examiner

ESTIMATING GROUND HEIGHT BASED ON LIDAR DATA

BACKGROUND

A vehicle can use data from a variety of sensors to estimate a ground height in an environment. In some examples, such sensor data can include lidar data. However, sensor data may not be available or accurate for some portions of an environment, which may leave gaps or holes in a resulting map. Maps can be difficult to make and validate and can be incomplete, which can present challenges when using the maps for traversing an environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
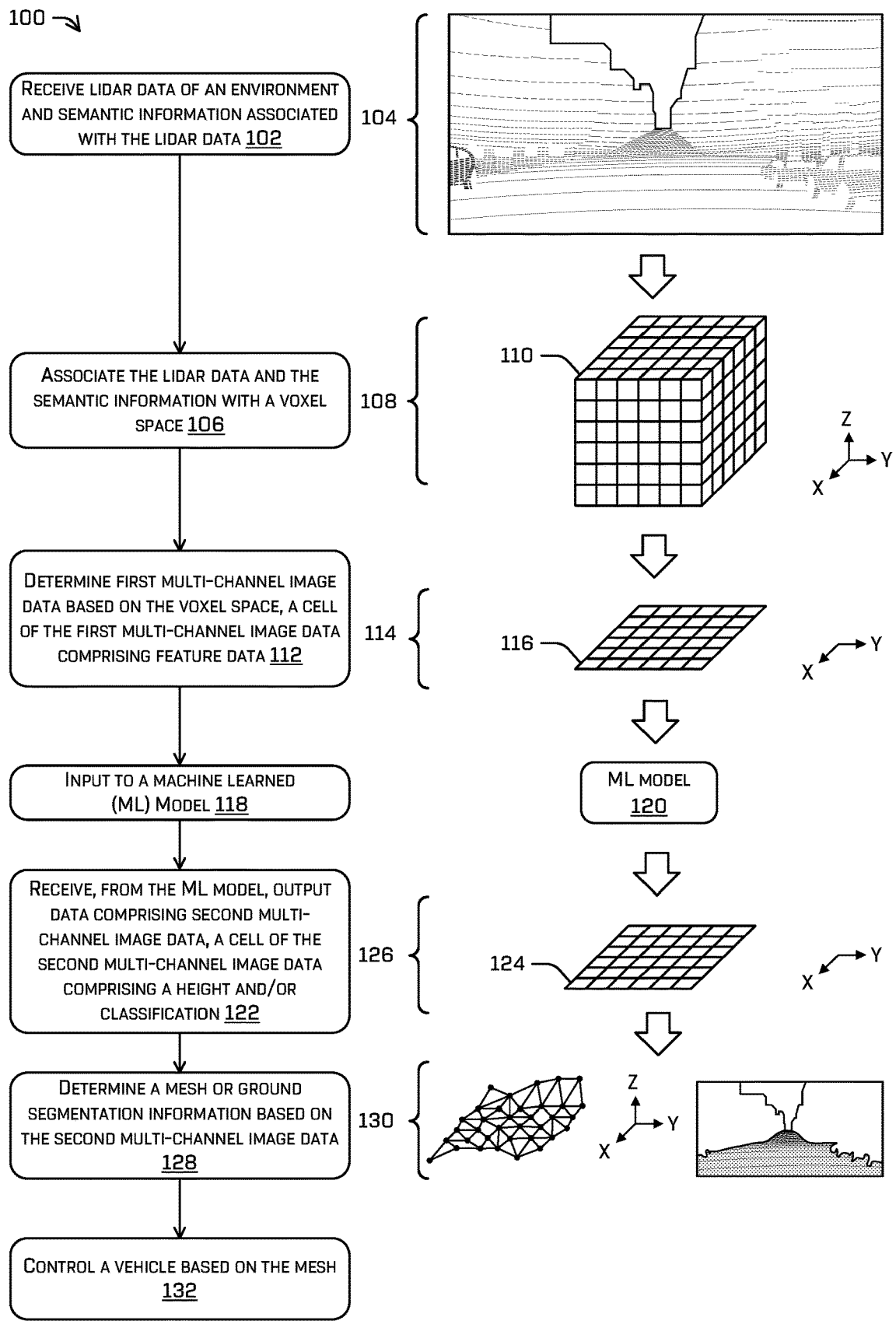
FIG. 1 is a pictorial flow diagram of an example process of estimating a ground height based on lidar data and controlling a vehicle based at least in part on the ground height.

Techniques for estimating or otherwise determining a ground height in an environment are discussed herein. For example, the lidar data can be received from a lidar system associated with a vehicle and can be associated with a voxel space, which can include the data in a grid of volume elements ("voxels") that represents three-dimensional data. Semantic information can be determined based on the lidar data and the semantic information can be associated with lidar data and/or the three-dimensional voxel space. In some examples the semantic information can include segmentation information representing a probability that a lidar point or a voxel is associated with a ground surface in the environment. A multi-dimensional input image can be determined based on the three-dimensional voxel space and input into a machine learned (ML) model. The ML model can output data that can include height data and/or classification data. A mesh can be determined based on the data output by the ML model, and the vehicle can be controlled based on the mesh.

As noted above, lidar data (or other depth data) can be represented in a three-dimensional voxel space. Feature data can be determined for a region of the three-dimensional space, such as a column of voxels. For example, feature data can include (for lidar points associated with a column), but is not limited to, an average height, a maximum height, a minimum height, a covariance, reflectivity, surface normal, a number of lidar points, and the like. In some examples, one or more features associated with the three-dimensional voxel space can be encoded or otherwise stored as a layer of a multi-dimensional input image. Thus, data can be efficiently represented for input to the machine learned model.

The machine learned model can be trained to receive multi-dimensional input data and can output multi-dimensional output data representing heights and/or classifications of regions of an environment. In some example, the ML model can output heights and/or classifications even where no input data is associated with a region, thereby providing an estimate of the height or classification associated with a region. A machine learned model can be trained based on currently existing maps, hand-annotated data, or as a vehicle traverses an environment and maps an environment in real-time, thereby providing data at various distances and viewing perspectives.

By utilizing lidar data and an ML model to estimate ground height, a functioning of a computing device of a vehicle can be improved in a number of ways. The ML model can be utilized to determine data associated with an environment of a vehicle. The data can be input into the ML model and can include cells, with each cell being associated a column of the voxel space in which the lidar data is represented. The ML model can output data including cells, with each cell of the data output by the ML model being associated with a cell of the data input into the ML mode. Each cell of the data output by the ML model can include a height and/or a classification associated with that cell. The data determined by the ML model can be generated in real-time and can be more robust and accurate than hand-tuned data. For example, the data output by the ML model can provide more accurate information associated with the environment, which can be used to determine a mesh associated with a ground surface in the environment. The mesh can include mesh vertexes, with each mesh vertex being associated with a height associated with a cell of the data output by the ML model. In contrast to hand-tuned map data that is utilized to estimate a ground surface according to existing technology, or static maps, the map data that is output by the ML model can be utilized to more accurately determine information associated with the surrounding regions of the mesh. Increasing an accuracy of estimating a ground surface improves clustering operations to determine objects, classification of objects, navigation of the vehicle in an environment, and the like. The techniques discussed herein can be utilized by in a main AI of the vehicle and can improve a functioning of a computing device in a number of additional ways. In some cases, operating the autonomous vehicle based on the information associated with the surrounding regions of the mesh can improve safety and efficiency of the autonomous vehicle. In some cases, utilizing the perception system to determine the mesh can allow generation of trajectories to control the autonomous vehicle to be simplified and more accurate.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using audio data. Further, although discussed in the context of lidar data, the techniques discussed herein can be used with any depth data such as Time-of-Flight sensors, RGB-D cameras, depth data determined from image data, and the like. Additionally, the techniques described herein can be used with real data (e.g., captured using sensor(s)), simulated data (e.g., generated by a simulator), or any combination of the two.

FIG. 1 is a pictorial flow diagram 100 of an example process of estimating a ground (e.g., ground surface) height based on lidar data and controlling a vehicle based at least in part on the ground height. An operation 102 can include receiving, by lidar sensors operating in connection with a perception system of a vehicle (e.g., autonomous vehicle), lidar data of an environment and semantic information associated with the lidar data. Although discussed in the context of lidar data, the operation 102 can include receiving any three-dimensional data or data comprising a depth component. The semantic information can include, for example, one or more semantic classification(s), label(s), or segmentation information. In some instances, the operation 102 can include receiving a plurality of lidar datasets from a plurality of lidar sensors operating in connection with the perception system. In some instances, the operation 102 can include combining or fusing data from two or more lidar sensors (and/or over a period of time) into a single lidar dataset (also referred to as a "meta spin"). In some instances, the operation 102 can include extracting a portion of the lidar data for processing, such as over a period of time. In some instances, the operation 102 can include receiving radar data (or other sensor data) and associating the radar data with the lidar data to generate a more detailed representation of an environment.

As noted above, the lidar data (e.g., lidar dataset(s)) can be associated with semantic information. An example of such techniques for determining and associating the lidar data with the semantic information are discussed in, for example, in U.S. patent application Ser. No. 15/820,245 titled "Sensor Data Segmentation" and filed Nov. 21, 2017, which is incorporated by reference herein in its entirety.

The semantic information can be associated with static and/or dynamic objects in the environment for tracking and/or trajectory planning. Portions of the environment corresponding to a ground, static objects, and/or dynamic objects can be identified and labeled with such semantic information. In some examples, data can be segmented based at least in part on the semantic information. In some instances, a list of dynamic objects can be provided to a tracking system to track and/or predict a trajectory of each dynamic object over time. In some instances, a list of static objects and/or an identification of the ground can be provided to a planner system to generate a trajectory for the vehicle that traverses a drivable surface and avoids or otherwise accounts for the static objects identified herein.

An example of a lidar dataset is illustrated in an example 104, which can include lidar data (e.g., a point cloud) associated with various objects in the environment, such as cars, trucks, roads, buildings, bikes, pedestrians, etc. The environment can include any number of objects.

An operation 106 can include associating the lidar data and the semantic information with a voxel space (e.g., three-dimensional voxel space). In one example, as data is accumulated over time, the operation 106 can include aligning a meta spin (e.g., the lidar dataset) with the voxel space. For example, the operation 106 can include determining a transformation to apply to the meta spin to align the meta spin to the voxel space. Data that is captured by a lidar scan can be aggregated together in the voxel space with data from previous lidar scans. The data that is gathered over time can be subsequently used, as part of determinations of an average height and/or a covariance, as described below. In particular, the operation 106 can include matching captured lidar data with data accumulated in the voxel space by determining the distance of observed points to a plane fitted to the existing accumulation of data. In some examples, this transformation can reduce an error between a position of a vehicle with respect to a location on a global map.

In some examples, data (e.g., actual lidar points in a current spin) associated with a current spin of the meta spin (e.g., the lidar dataset) can be associated with the voxel space. The data can be utilized to determine which voxels overlap with one another, and to determine data for individual points of the voxel space. For example, individual voxels may include data representing a number of data points, an average intensity, an average x-value of the data, an average y-value of the data, an average z-value of the data, and/or a covariance matrix based on the lidar data associated with the individual voxel. Each voxel can be associated with semantic information based at least in part on evaluating the neighboring voxel(s). The semantic information can be utilized to determine data probabilities that lidar points are associated with one of multiple semantic classes, such as a probability (e.g., 80% probability) that a lidar point is associated with a vehicle, a probability (e.g., 20% probability) that a lidar point is associated with a pedestrian, a probability (10% probability) that a lidar point is associated with a bicycle, etc. The data can be associated with the voxel space, in addition or in alternative, to the meta spin being aligned with the voxel space.

In some instances, the operation 106 can include mapping individual points of the point cloud to individual voxels. In some instances, the operation 106 can include subtracting a motion vector associated with the lidar data, for example, in an event that the lidar data is captured by a moving platform, such as the vehicle, to convert the lidar data to a stationary reference point, for example. That is, in some instances, the lidar data can be associated with a voxel space that is fixed with respect to a global map, for example. By way of example, the lidar data can be associated with a voxel space by determining coordinate frames between an inertial frame or a vehicle-relative frame and a global frame. The lidar data can indicate one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc.

As noted above, the operation 106 can include associating the semantic information with the voxel space. For example, the lidar data can be associated with one or more semantic classification(s) (e.g., label(s)). A label can be applied to a voxel or a lidar point in a column 110 in the voxel space. The label can be associated with a type (e.g., walkable, drivable, etc.) of surface and/or object. For example, the label can be associated with a walkable surface, a drivable surface, an object, etc.

In some examples, lidar data can be associated with the voxel space based at least in part on a probability that the lidar data is associated with semantic information. Thus, the operation 106 can include a filtering step to remove data or isolate data to be associated with one or more semantic classifications. For example, the semantic information may comprise a probability that a particular voxel or lidar data point is associated with a classification. If a probability of a voxel or lidar point is below a threshold, the operation 106 can include removing or not including the voxel or lidar points in the voxel space.

An example of a voxel space (e.g., three-dimensional voxel space) is illustrated in an example 108. In some examples, the voxel space can include tens, hundreds, or more voxels in each of three dimensions (e.g., x, y, z), although any number of voxels can be included in the voxel space. In some instances, the voxel space can correspond to a physical environment, such as an area around an origin or a virtual origin of the lidar dataset. For example, the voxel space can represent an area 100 meters wide, 100 meters long, and 100 meters high.

Further, each voxel in the voxel space can represent a physical area, such as 50 centimeters in each dimension. As can be understood in the context of this disclosure, the voxel space can represent any area of the environment, and individual voxels can represent any volume as well. In some instances, voxels can be a uniform size throughout the voxel space, while in some instances, a volume of a voxel can vary based on a location of the voxel relative to an origin of the data. For example, as the density of lidar data can decrease as a distance from a lidar sensor increases, the size of the voxel in the voxel space can increase in proportion to a distance from the voxel to a lidar sensor (or an origin representing a plurality of lidar sensors).

An operation 112 can include determining multi-channel image data (e.g., a two-dimensional input grid) based on the voxel space. Each region or portion of the multi-channel image data can be determined as a region of a two-dimensional representation associated with a column (or other dimension) of the voxel space. In some examples, each region of the multi-channel image data can be a cell of the two-dimensional representation associated with the column of the voxel space. Each region of the two-dimensional input grid can be associated with a 50 centimeter×50 centimeter region and can include feature data. Each region can be associated with (e.g., positioned adjacent to) one or more adjacent (e.g., neighbor) regions.

An example of multi-channel image data (e.g., first multi-channel image data) is illustrated in an example 114. The first multi-channel image data can include a plurality of regions 116. Each of the regions 116 can be determined as the region of the two-dimensional representation and can be associated with a column (e.g., 110) of the voxel space. For example, the region 116 can be associated with the column 110, based on three-dimensional information associated with the column 110 being converted to two-dimensional information associated with the region 116.

Each of the regions can include feature data. By way of example and without limitation, the feature data can include a maximum height, a minimum height, an average height, a covariance (e.g., covariance matrix), a surface normal, and/or a classification associated with the voxel. Feature data can be associated with the region 116, for example. The feature data for each of the regions can be determined similarly as for the feature data 206, as described below for FIG. 2.

An operation 118 can include inputting the multi-channel image data to the ML model. As noted above, the multi-channel image data input to the ML model can be associated (e.g., combined/integrated) with semantic information comprising a ground classification probability. Alternatively or additionally, the multi-channel image data can be associated (e.g., combined/integrated) with a vehicle classification probability and/or a pedestrian classification probability.

In some examples, the ground classification probability can indicate a probability of individual data points or regions of the first multi-channel image data being associated with the ground surface. The vehicle classification probability can indicate a probability of individual data points or regions of the first multi-channel image data being associated with at least a portion (e.g., door, roof, etc.) of a vehicle. The pedestrian classification probability can indicate a probability of individual data points or regions of the first multi-channel image data being associated with at least a portion (e.g., leg, torso, head, etc.) of a pedestrian.

In some examples, the first multi-channel image data can include one or more layer(s) of image data. For example, the first multi-channel image data can include a first two-dimensional layer (e.g., first channel) associated with first feature data and a second two-dimensional layer (e.g., second channel) associated with second feature data. For example, the layer(s) of image data can include a layer of image data associated with a maximum height associated with each of the voxels of the voxel space, a layer of image data associated with a minimum height associated with each of the voxels, a layer of image data associated with an average height associated with each of the voxels, a layer of image data associated with a covariance associated with each of the voxels, a layer of image data associated with a surface normal associated with each of the voxels, and/or a layer of image data associated with a classification probability associated with each of the voxels.

In some examples, the multi-dimensional image data can comprise layers associated with multiple classes of semantic information, although in some examples, data associated with certain classifications can be omitted from the multi-channel image data.

An example of an ML model is illustrated as ML model 120. The ML model 120 can receive the first multi-channel image data. In some examples, the first multi-channel image data input into the ML model 120 can include the region(s) (e.g., the region 116) representing the voxel space and the feature data for each of the region(s) (e.g., the feature data for the region 116).

An operation 122 can include receiving, from the ML model 120, output data including multi-channel image data (e.g., two-dimensional output grid(s)). Each cell of the multi-channel image data output by the ML model 120 can include a height and/or a classification.

An example of the multi-channel image data (e.g., second multi-channel image data) output by the ML model 120 is illustrated in an example 126. The second multi-channel image data can include a plurality of regions (e.g., regions 124). Each of the regions 124 of the second multi-channel image data output by the ML model 120 can be associated with a corresponding region of the first multi-channel image data input into the ML model 120. In some examples, each of the regions 124 of the second multi-channel image data output by the ML model 120 can be a cell associated with a corresponding cell of the first multi-channel image data input into the ML model 120. For example, each of the regions 124 can be associated with a region 116 and can include a height and/or a classification.

An operation 128 can include determining a mesh and/or ground segmentation information based on the multi-channel image data output by the ML model 120. In some examples, the mesh can be determined based on the data output from the ML model 120. For example, the mesh can be determined based on the height and/or classification associated with each region of the multi-channel image data output by the ML model 120. In some examples, any of various models, algorithms, and/or machine learned algorithms can be utilized to create a mesh based on a height associated with regions of the multi-channel output image data to determine polygons (e.g., triangles) including at least three points to create a surface.

In some examples, the operation 128 can include determining, additionally or alternatively to the mesh, the ground segmentation information based on the multi-channel image data output by the ML model 120. The ground segmentation information (e.g., ground segmentation points) can be determined similarly as described above for the mesh.

An example of the mesh and the ground segmentation information is illustrated in an example 130. The mesh and/or the ground segmentation information can include information associated with an object and/or the ground surface. The mesh and/or the ground segmentation information can be determined based on a height, a mesh vertex, and a polygon associated with each region of the second multi-channel image data output by the ML model 120. For example, the mesh vertex associated with each region can be determined utilizing the marching cubes algorithm, based on the corresponding height. For example, the polygon associated with each region can be determined based on the corresponding mesh vertex.

In some instances, the mesh and/or the ground segmentation information can represent an estimated height of a ground surface of an environment proximate to a vehicle. The mesh and/or the ground segmentation information can be used to remove a ground surface from a point cloud and/or to perform segmentation on captured data. For example, data within a particular height or distance from the mesh can be determined to be associated with a ground surface. Such data can be removed or omitted, leaving data points that are not associated with ground surface. The remaining points can be clustered based on K-means clustering, nearest neighbors, adjacency thresholds, and the like. Objects can be determined based on such clustering, and objects can be tracked over time to determine velocity, pose, etc. associated with such objects.

An operation 132 can include controlling a vehicle based on the mesh and/or the ground segmentation information. In some examples, the vehicle can be controlled to have a trajectory within a region associated with the mesh and/or the ground segmentation information, based on the mesh and/or the ground segmentation information being determined to be associated with the ground surface. By determining that the mesh and/or the ground segmentation information is associated with the ground surface and is not associated with an object (e.g., non-ground point), the vehicle can be controlled to navigate toward and through the region.

In some examples, the vehicle can be controlled to reduce a likelihood of collision with another object. The vehicle can be controlled to avoid (e.g., take a detour around) the object or to stop, based on the mesh and/or the ground segmentation information (e.g., the mesh and/or the ground segmentation information being determined to be associated with the non-ground point). Alternatively, the vehicle can be controlled to slow down to allow a position of the other object to change to a new position, based on the other object being a vehicle. The vehicle can then determine that a trajectory of the vehicle does not include the new position of the other object. The vehicle can then be controlled based on the trajectory.

Therefore, and as described herein, lidar data can be captured and represented in a three-dimensional voxel space associated with an environment around a vehicle. Multi-channel image data can be determined based on the three-dimensional voxel space. The multi-channel image data can include two-dimensional representation(s) of the three-dimensional voxel data. The multi-channel image data can be input into an ML model that outputs multi-channel output image data including a height and/or a classification of each region in the multi-channel output image data. A mesh and/or ground segmentation information can be determined based on the output from the ML model that includes an accurate and complete representation of the ground surface. The mesh and/or the ground segmentation information can be associated with a ground surface with greater accuracy than in conventional technologies, notwithstanding holes (e.g., missing portions) in the three-dimensional voxel data and/or the initial two-dimensional representation. By increasing the accuracy of determining whether the mesh and/or the ground segmentation information is associated with the ground surface, the vehicle can be controlled along a trajectory without improperly determining that there is a risk of a potential collision or without missing possible collisions. The vehicle can be more effectively controlled by avoiding deviations due to false indications of potential collisions.

Furthermore, by utilizing the mesh and/or the ground segmentation information to control the vehicle, expansion into new geographical regions is simpler. By determining the mesh and/or the ground segmentation information with the ML model, unrealistic ground surface predictions can be avoided, while implicitly smoothing results of the ground surface predictions. The vehicle that is controlled utilizing the mesh and/or the ground segmentation information that is output from the ML model is also safer and more reliable. The vehicle, which can be controlled autonomously without human input, is able to accurately determine the ground surface and determine a planned route or trajectory in real time, with higher levels of efficiency and accuracy.

Figure 2:
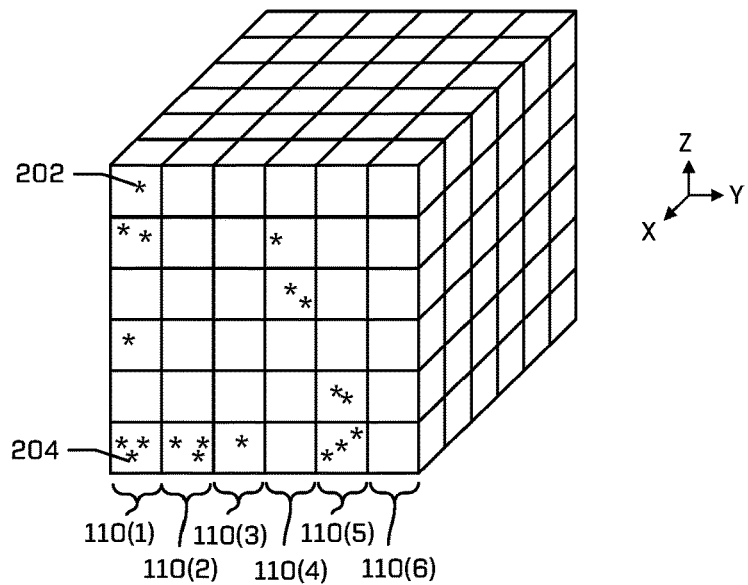
FIG. 2 is an illustration of an example process of inputting first multi-channel image data to a machine learned (ML) model based on a voxel space, and receiving second multi-channel image data from the ML model.
Figure 2:
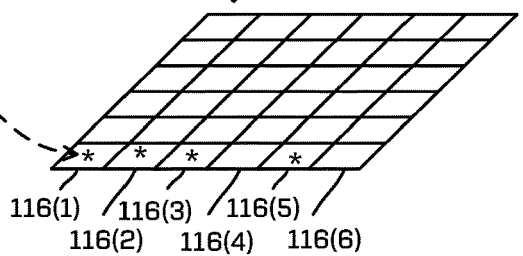
Figure 2:
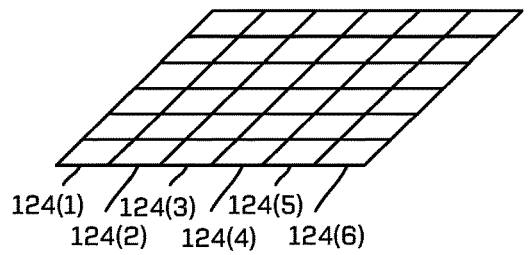

FIG. 2 is an illustration 200 of an example process of inputting first two-dimensional image data to a machine learned (ML) model based on a voxel space, and outputting second multi-channel image data from the ML model.

As illustrated in FIG. 2, a voxel space (e.g., three-dimensional voxel space) can be determined based on lidar data received from a lidar system. The voxel space can be implemented similarly as for the example of the voxel space illustrated in the example 108, as described above for FIG. 1.

In some examples, the voxel space can include one or more column(s) 110 (e.g., column 110(1)-110(6)). The column 110(1) can include, for example, points associated with the ground and points associated with a door of a vehicle, a roof of a vehicle, and/or a building. The column 110(2) can include points associated with the ground. The column 110(3) can include a point associated with the ground (e.g., points associated with a height below a threshold minimum height). The column 110(4) can include points associated with the vehicle and/or the building (e.g., points associated with a height above a threshold maximum height). The column 110(5) can include points associated with the ground and/or points associated with the vehicle and/or the building. The column 110(6) can include data indicating that no points are associated with the column 110(6), which can be utilized to fill holes associated with the ground, based on interpolation of data (e.g., at least one or more point) associated with the voxel space.

As illustrated, the column 110(1) includes points 202 and 204. In some examples, the point 202 can represent a point associated with the vehicle or the building, while the point 204 can represent a point associated with the ground.

As noted above, the voxel space can be associated with semantic information. For example, such semantic information can be associated with the lidar data and/or the voxel space. The semantic information can be utilized to determine multi-channel image data input into an ML model, the ML model being trained to output semantic classifications associated with points indicative of a probability that the point is associated with a semantic classification (e.g., ground, vehicle, pedestrian, bicycle, building, pet, foliage, etc.). Semantic information can be determined for individual points (e.g., points 202 and 204)

The voxel space can represent the lidar data received from the lidar system. The lidar data can be represented in the voxel space as raw point cloud data (e.g., with individual <x, y, z, range, time, etc.> values associated with data points) or as a statistical accumulation of data.

In some examples, features can be determined for a particular voxel, a particular column of the voxel space, and/or for region(s) associated with multi-channel image data. The features can include a number of data points associated with a voxel, column, and/or region, an average intensity, an average x-value of the portion of the lidar data, an average-y value of the portion of the lidar data, an average z-value of the portion of the lidar data, and/or a covariance matrix based on the portion of the lidar data.

In some examples, multi-channel image data (e.g., two-dimensional input grid) can be determined based on the voxel space. The multi-channel image data (e.g., first multi-channel image data) can be implemented similarly as for the example of the multi-channel image data illustrated in the example 114, as described above for FIG. 1. Each region of the multi-channel image data can be associated with a region of a two-dimensional representation of the voxel space and can include feature data. Each region of the multi-channel image data can be associated with a 50 centimeter×50 centimeter region.

In some examples, the multi-channel image data can be determined by compressing each column of the voxel space into a region of the multi-channel image data. The multi-channel image data can include regions 116(1)-116(6). Each region of the multi-channel image data can be associated with a column (or other portion) of the voxel space. For example, three-dimensional information associated with the column can be converted to two-dimensional information or multi-channel two-dimensional information. As noted above, features (e.g., features 206) can be associated with the voxel space or the multi-channel image data. The features 206 can include, but are not limited to, a maximum height, a minimum height, an average height, a covariance (e.g., covariance matrix), a surface normal, and/or a classification associated with the region.

In some examples, the maximum height of the features 206 can include a height associated with a point (e.g., point 202) in a column (e.g., column 110(1)) of the voxel space that is separated from the ground surface by a distance that is greater than or equal to a distance from the ground surface (or any reference point) to any of the other points of the column. The minimum height of the features 206 can include a height associated with a point (e.g., point 204) in the column that is separated from the ground surface by a distance that is less than or equal to a distance from the ground surface to any of the other points of the column. By way of example, the minimum height could be at, or associated with, the ground surface (e.g., the minimum height can be equivalent to, or the same as, the height of the ground surface). In a case that a column of the voxel space is associated with the ground surface, and not associated with an object, the minimum height and the maximum height associated with a corresponding voxel of the multi-channel image data can be associated with the ground surface (e.g., the minimum height can be the same as the maximum height). The average height of the features 206 can include a height that is an average of a distance from the ground surface to each of the points of the column.

In some examples, the covariance of the features 206 for each voxel (e.g., locally flat voxel) of the multi-channel image data can include a surface being fit to data in the voxel (e.g., individual lidar data points and/or a data provided by a calculation performed on a covariance matrix (e.g., an Eigenvalue decomposition or principle component analysis)).

By way of another example, and without limitation, a surface normal of the features 206 can be determined by calculating a normal of a cross product of vectors indicating directions from a point in a voxel, to two adjacent points. By way of another example and without limitation, such a surface normal determination can be done by performing an eigenvalue decomposition on the covariance matrix associated with an individual voxel. In some instances, each region of the multi-channel image data can be determined to be a locally flat region by determining a surface associated with the region based on values associated with neighboring region.

In some examples, the classification probability of the features 206 can indicate a probability of individual data points or regions of the first multi-channel image data being associated with the ground surface or at least a portion of an object (e.g., vehicle, pedestrian, etc.). For example, the classification probability can include a ground classification probability, a vehicle classification probability, or a pedestrian classification probability.

In some instances, multi-channel image data (e.g., first multi-channel image data) can be input to the ML model (e.g., ML model 120). In some examples, the multi-channel image data can include, as part of a three-dimensional voxelization strategy, data associated with the voxel space being sliced with more than one slice (e.g., three slices), such that each slice is associated with a horizontal cross section of the voxel space. A layer of image data associated with each of the slices can be included in the multi-channel image data, based on two-dimensional feature compression.

In some examples, the ML model 120 can input the first multi-channel image data, which includes each region (e.g., regions 116(1)-116(6)) in the first multi-channel image data. In some examples, raw information including the first multi-channel image data can be input into the ML model 120. The raw information can include the features 206 (e.g., a maximum height (e.g., a height of a highest lidar point associated with each region), a minimum height (e.g., a height of a lowest lidar point associated with each region), a surface normal of each region, a classification of each region), and/or a probability of each region being associated with the classification, the probability being determined based on the semantic segmentation.

In some examples, the ML model 120 can output multi-channel image data (e.g., two-dimensional output grid). Regions (e.g., regions 124(1)-124(6)) of the multi-channel image data (e.g., second multi-channel image data) output by the ML model 120 can be associated with corresponding regions (e.g., regions 116(1)-116(6)) of the first multi-channel image data input into the ML model 120. For example, the region 124(1) can be associated with the region 116(1). Each of the regions (e.g., regions 124(1)-124(6)) of the second multi-channel image data output by the ML model 120 can include a height and/or a classification. In other words, the multi-channel image data can include, for example, the height and/or the classification associated with each region.

In some examples, each region of the second multi-channel image data can include a height and/or a classification associated with a likelihood (e.g., probability) that the region is associated with the ground surface. For example, a height (e.g., average height) and/or a classification associated with a region of the second multi-channel image data can be determined by the ML model 120 based on the features 206 associated with the region.

In some examples, a height associated with a region of the second multi-channel image data can be determined to be associated with a ground surface height based on determining that the minimum height and the maximum height in the features 206 associated with the region are the same height. Alternatively or additionally, the height of the region of the second multi-channel image data can be determined to be associated with a ground surface height based on a ground classification probability. Alternatively or additionally, the height of the region of the second multi-channel image data can be determined to be associated with a ground surface height based on a vehicle classification probability and/or a pedestrian classification probability. In some examples, the height is determined to be associated with a height of an object, based on the region being associated with a region of the environment that includes the object.

In some examples, a classification of a region of the second multi-channel image data can be determined to be associated with the ground surface, based on a ground classification probability. Alternatively or additionally, the classification of the region of the second multi-channel image data can be determined based on a vehicle classification probability and/or a pedestrian classification probability. The ground classification probability, the vehicle classification probability, and the pedestrian classification probability can be determined similarly as described above. In some examples, the classification can be determined to be associated with an object, based on the region being associated with a region of the environment that includes the object.

By determining the height and/or the classification of each region of the second multi-channel image data, the likelihood that the region is associated with the ground surface can be determined notwithstanding information missing from the voxel space and/or the first multi-channel image data. Output information including and/or associated with the second multi-channel image data can be determined by outputting the second multi-channel image data from the ML model 120, based on the first multi-channel image data.

Therefore, and as described herein, three-dimensional information can be constructed based on lidar data received from a lidar system associated with an autonomous vehicle. The three-dimensional information can be provided as a cube-shaped space with voxels arranged in columns and rows. A column of voxels in the three-dimensional space can include a variety of points associated with objects, such as a car, a person, or a ground surface. Properties of the points such as a height of each point can be captured to be provided to as a multi-channel input image, such as a plurality of two-dimensional image data. The two-dimensional image data can include regions that include data to be input to a ML model. The two-dimensional image data can be associated with each point captured by the two-dimensional image data. The two-dimensional image data can include minimum, maximum, and average heights, a surface normal, and/or semantic segmentation probabilities.

Figure 3A:
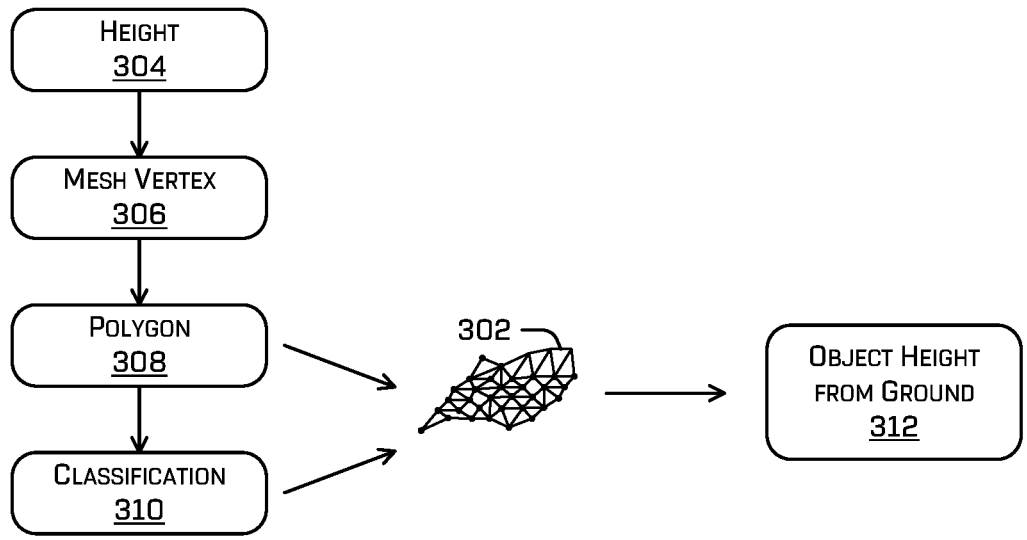
FIGS. 3A and 3B are illustrations of example processes of outputting an object height based on a mesh and/or ground segmentation information.
Figure 3B:
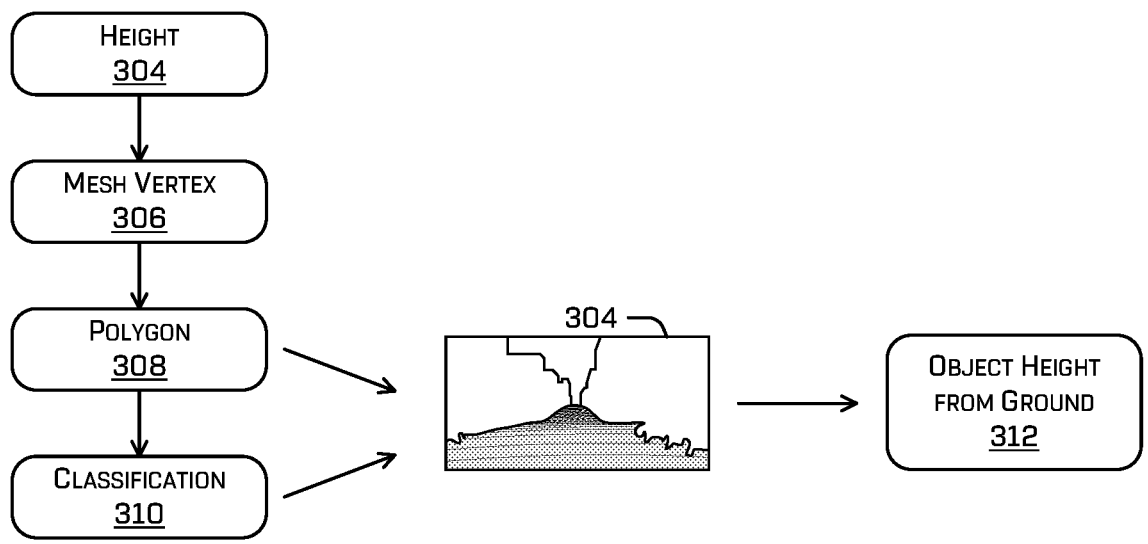

FIGS. 3A and 3B are illustrations of example processes outputting an object height based on a mesh 302 and/or ground segmentation information 304. The mesh 302 can be implemented similarly as for the example of the mesh illustrated in the example 130, as described above for FIG. 1. The ground segmentation information 304 can be implemented similarly as for the example of the ground segmentation information illustrated in the example 130, as described above for FIG. 1.

As illustrated in FIG. 3A, the mesh 302 can be determined based on a height 304, a mesh vertex 306, a polygon 308, and/or a classification 310. The height 304 can include a height associated with a region of multi-channel image data (e.g., second multi-channel image data) output by a machine learned (ML) model (e.g., ML model 120). The height 304 can be determined similarly as for the height of the region of the second multi-channel image data, as described above for FIG. 1.

In some examples, the mesh vertex 306 can be determined based on the height 304. For example, the mesh vertex 306 can be associated with the region of the second multi-channel image data and have the height 304. The mesh vertex 306 can include a vertex utilized to determine the mesh 302, which can include a triangulated mesh. Each region of the second multi-channel image data can be associated with a single mesh vertex utilized to determine the mesh 302. In some instances, the region of the second multi-channel image data that is utilized to determine the height 304 associated with the mesh vertex 306 can have a non-linear relationship with the mesh vertex 306.

In some examples, the polygon 308 can be determined based on the mesh vertex 306. In some instances, the polygon 308, along with remaining polygons determined based on corresponding mesh vertexes associated with corresponding regions of the second multi-channel image data, can be utilized to determine the mesh 302. The mesh 302 can be utilized to determine a map with three-dimensional data of an environment through which a vehicle is travelling.

In some examples, the classification 310 can be determined similarly as for each region of the second multi-channel image data, as described above for FIG. 2. The mesh 302 can be determined based on the second multi-channel image data output by the ML model 120. The mesh 302 can include the classification (e.g., classification 310) associated with each of the mesh vertexes (e.g., mesh vertex 306) of the mesh 302. The classification 310 can be associated with one of multiple semantic classes, such as a probability (e.g., 80% probability) that the mesh vertex 306 is associated with a vehicle, a probability (e.g., 20% probability) that mesh vertex 306 is associated with a pedestrian, a probability (e.g., 10% probability) that mesh vertex 306 is associated with a bicycle, etc. In some examples, the height 304 and/or the classification 310 can be utilized to identify whether the region associated with the mesh vertex 306 is a drivable surface, a road, not a road (e.g., an object, a building, etc.), and the like.

In some examples, an object height from ground 312 associated with each object in the environment can be determined based on the mesh 302. The mesh 302 can be associated with points (e.g., points of the voxel space) associated with objects in the environment. By way of example, the mesh 302 can be associated with one or more point(s) (e.g., one or more point(s) of the voxel space) associated with an object. The object height from ground 312 associated with the object can indicate a distance between the object and the ground surface. For example, the object height from ground 312 can include a height associated with the object. For example, the object height from ground 312 can include a height associated with the ground surface, based on the object height from ground 312 not being associated with an object other than ground. In some examples, the object height from ground 312 can include a distance (e.g., z-value (e.g., z coordinate value)) between the object and the ground surface, based on the polygon (e.g., polygon 308) associated with the same x-y value (e.g., x-y coordinate values) as the object. The height associated with the object can be equal to or larger than the height associated with the ground surface. The object height from ground 312 can be associated with an object above the mesh 302 or an object below the mesh 302.

As illustrated in FIG. 3B, the ground segmentation information 304 can be determined, and utilized to determine the object height from ground 312, similarly as for the mesh 302, as described above for FIG. 3A. In some examples, the ground segmentation information 304 can be determined based on the height 304, the mesh vertex 306, the polygon 308, and/or the classification 310 associated with each region of the second multi-channel image data output by the ML model. The ground segmentation information 304 can be utilized to determine the object height from ground 312 associated with each object in the environment. The object height from ground 312 can indicate a distance between an object and the ground surface. For example, the object height from ground 312 can include a height associated with an object or a height associated with the ground surface. The height associated with the object can be equal to or larger than the height associated with the ground surface. The object height from ground 312 can be associated with an object having a z-value that is above or below a z-value associated with a position of the ground segmentation information 304 that has the same x-y-values as the object.

Therefore, and as described herein, various parameters can be utilized to determine a mesh and/or ground segmentation information, which is utilized to determine a map of an environment proximate a vehicle. The mesh and/or the ground segmentation information can be used as a ground surface to remove ground points associated with a point cloud for segmenting, clustering, and/or determining objects in an environment. By utilizing the mesh and/or the ground segmentation information to identify ground points and object points, and to remove the ground points, the map of the environment more accurately identifies objects in the environment.

The vehicle can be controlled to proceed into a region of the environment that is associated with the mesh and/or the ground segmentation information if the mesh and/or the ground segmentation information indicates that the region is the ground surface. The vehicle can determine that it is required to stop only when an object in the environment is identified. Because the accuracy of the mesh and/or the ground segmentation information being utilized to determine that the region of the environment is the ground surface is increased, the vehicle does not unnecessarily stop due to false indications of objects that would otherwise happen due to incomplete data provided by conventional technology.

Figure 4:
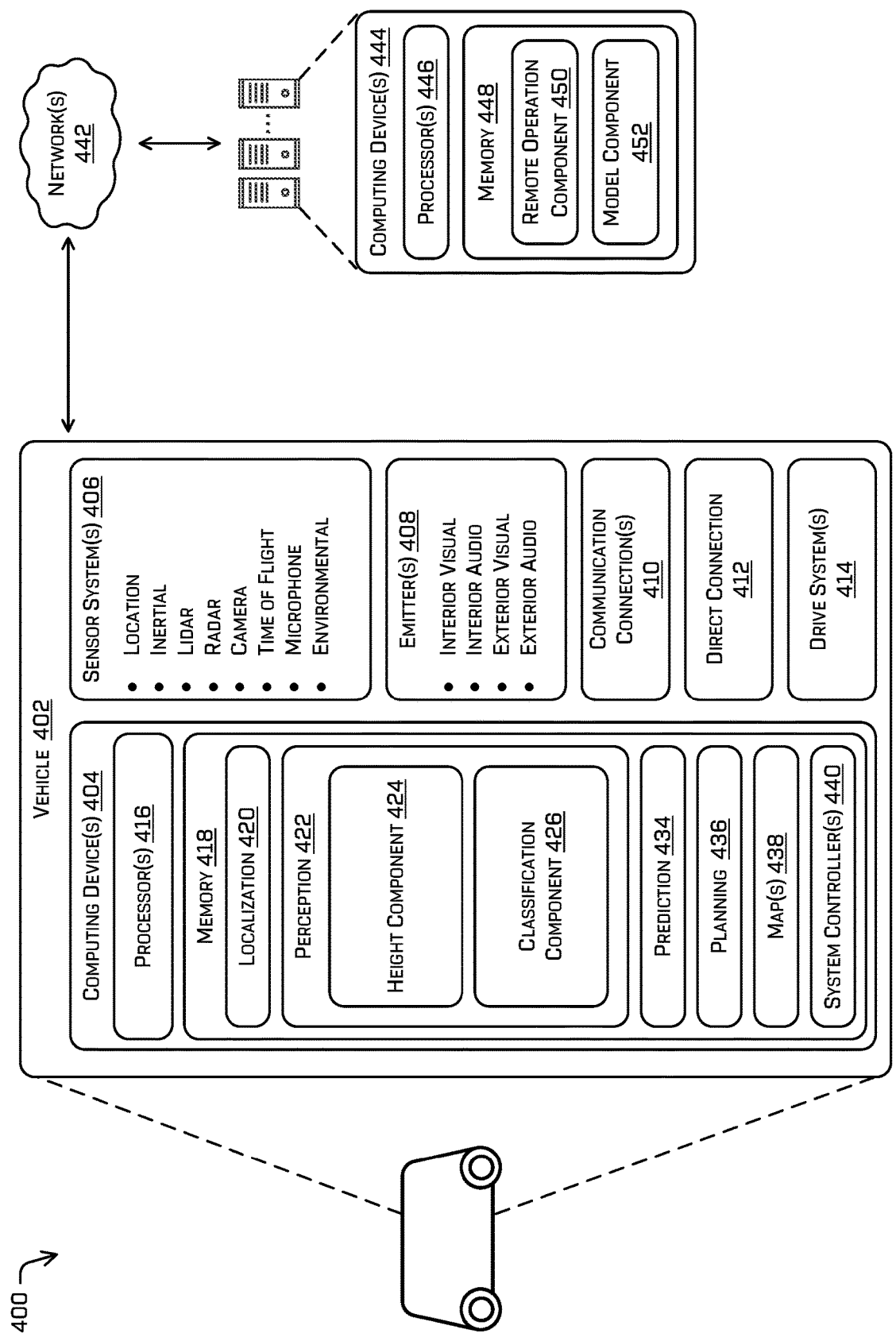
FIG. 4 is a block diagram of an example system for implementing the techniques described herein.

FIG. 4 is a block diagram of an example system for implementing the techniques described herein. In at least one example, the system 400 can include a vehicle 402. In the illustrated example system 400, the vehicle 402 is an autonomous vehicle; however, the vehicle 402 can be any other type of vehicle.

The vehicle 402 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 402 can be configured to control all functions from start to completion of the trip, including all parking functions, it can not include a driver and/or controls for driving the vehicle 402, such as a steering wheel, an acceleration pedal, and/or a brake pedal. This is merely an example, and the systems and methods described herein can be incorporated into any ground-borne, airborne, or water-borne vehicle, including those ranging from vehicles that need to be manually controlled by a driver at all times, to those that are partially or fully autonomously controlled.

The vehicle 402 can include one or more computing device(s) 404, one or more sensor system(s) 406, one or more emitter(s) 408, one or more communication connection(s) 410 (also referred to as communication devices and/or modems), at least one direct connection 412 (e.g., for physically coupling with the vehicle 402 to exchange data and/or to provide power), and one or more drive system(s) 414. The one or more sensor system(s) 406 can be configured to capture sensor data associated with an environment.

The one or more sensor system(s) 406 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 406 can include multiple instances of each of these or other types of sensors. For instance, the time-of-flight sensors can include individual time-of-flight sensors located at the corners, front, back, sides, and/or top of the vehicle 402. As another example, the camera sensors can include multiple cameras disposed at various locations about the exterior and/or interior of the vehicle 402. The one or more sensor system(s) 406 can provide input to the computing device 404.

The vehicle 402 can also include one or more emitter(s) 408 for emitting light and/or sound. The one or more emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which can comprise acoustic beam steering technology.

The vehicle 402 can also include one or more communication connection(s) 410 that enable communication between the vehicle 402 and one or more other local or remote computing device(s) (e.g., a remote teleoperation computing device) or remote services. For instance, the one or more communication connection(s) 410 can facilitate communication with other local computing device(s) on the vehicle 402 and/or the one or more drive system(s) 414. Also, the one or more communication connection(s) 410 can allow the vehicle 402 to communicate with other nearby computing device(s) (e.g., other nearby vehicles, traffic signals, etc.).

The one or more communications connection(s) 410 can include physical and/or logical interfaces for connecting the computing device 404 to another computing device or one or more external networks 442 (e.g., the Internet). For example, the one or more communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 402 can include one or more drive system(s) 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor system(s) 406 to detect conditions of the drive system(s) 414 and/or the surroundings of the vehicle 402. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) 406 on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) 406 and to control operation of the various vehicle systems. In some examples, the drive system controller can include one or more processor(s) and memory communicatively coupled with the one or more processor(s). The memory can store one or more components to perform various functionalities of the drive system(s) 414. Furthermore, the drive system(s) 414 also include one or more communication connection(s) that enable communication by the respective drive system with one or more other local or remote computing device(s).

The computing device 404 can include one or more processor(s) 416 and memory 418 communicatively coupled with the one or more processor(s) 416. In the illustrated example, the memory 418 of the computing device 404 stores a localization component 420, a perception component 422 comprising a height component 424, a classification component 426, a prediction component 434, a planning component 436, a maps component 438, and one or more system controller(s) 440. Though depicted as residing in the memory 418 for illustrative purposes, it is contemplated that the localization component 420, the perception component 422, the height component 424, the classification component 426, the prediction component 434, the planning component 436, the maps component 438, and the one or more system controller(s) 440 can additionally, or alternatively, be accessible to the computing device 404 (e.g., stored in a different component of vehicle 402) and/or be accessible to the vehicle 402 (e.g., stored remotely).

In memory 418 of the computing device 404, the localization component 420 can include functionality to receive data from the sensor system(s) 406 to determine a position of the vehicle 402. For example, the localization component 420 can include and/or request/receive a three-dimensional map of an environment and can continuously determine a location of the autonomous vehicle within the map. In some instances, the localization component 420 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 420 can provide data to various components of the vehicle 402 to determine an initial position of an autonomous vehicle for generating a trajectory, as discussed herein.

The perception component 422 can include functionality to perform object detection, segmentation, and/or classification. In some examples, the perception component 422 can provide processed sensor data that indicates a presence of an entity that is proximate to the vehicle 402 and/or a classification of the entity as an entity type (e.g., car, pedestrian, cyclist, building, tree, road surface, curb, sidewalk, unknown, etc.). In additional and/or alternative examples, the perception component 422 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 422 can use perception algorithms to determine a perception-based bounding box associated with an object in the environment based on sensor data. For example, the perception component 422 can receive image data and classify the image data to determine that an object is represented in the image data.

Then, using detection algorithms, the perception component 422 can generate a two-dimensional bounding box and/or a perception-based three-dimensional bounding box associated with the object. The perception component 422 can further generate a three-dimensional bounding box associated with the object. As discussed above, the three-dimensional bounding box can provide additional information such as a location, orientation, pose, and/or size (e.g., length, width, height, etc.) associated with the object.

The perception component 422 can include functionality to store perception data generated by the perception component 422. In some instances, the perception component 422 can determine a track corresponding to an object that has been classified as an object type. For purposes of illustration only, the perception component 422, using sensor system(s) 406 can capture one or more images of an environment. The sensor system(s) 406 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 406, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The height component 424 can include functionality to calculate or otherwise determine a height of a region of multi-channel image data output from a machine learned (ML) component, such as described in detail herein and in particular with respect to any of FIGS. 1-3B. In some examples, the height component 424 can comprise an ML component. For example, the height component 424 can receive features associated with a region of multi-channel image data input to the ML component, the region of the input multi-channel image data being associated with the region of the output multi-channel image data. The features can include a maximum height (e.g., a height of a highest point associated with the region), a minimum height (e.g., height of a lowest point associated with the region), a surface normal of the region, and/or a classification associated with the region of the input multi-channel image data. The height of the region of the output multi-channel image data can be determined by the height component 424 to be associated with a ground surface height. The height of the region of the output multi-channel image data can be determined to be associated with the ground surface height based on determining that the minimum height and the maximum height associated with the region of the output multi-channel image data are the same height or are within a threshold distance.

Alternatively or additionally, the height of the region of the output multi-channel image data can be determined to be associated with a ground surface height based on a ground classification probability. Alternatively or additionally, the height of the region of the output multi-channel image data can be determined to be associated with a ground surface height based on a vehicle classification probability and/or a pedestrian classification probability. In some examples, the height can be determined to be associated with a height of an object, based on the region of the output multi-channel image data being associated with the environment that includes the object.

The classification component 426 can include functionality to calculate or otherwise determine a classification of a region of multi-channel image data output from the ML component, such as described in detail herein and in particular with respect to any of FIGS. 1-3B. In some examples, the classification component 426 can include a machine learned component. The classification of the region of the output multi-channel image data can be determined to be associated with the ground surface, based on a ground classification probability. Alternatively or additionally, the classification of the region of the output multi-channel image data can be determined based on a vehicle classification probability and/or a pedestrian classification probability. The ground classification probability, the vehicle classification probability, and the pedestrian classification probability can be determined similarly as described above. In some examples, the classification can be determined to be associated with an object, based on the region of the output multi-channel image data being associated with the environment that includes the object.

The prediction component 434 can generate one or more probability maps representing prediction probabilities of possible locations of one or more objects in an environment. For example, the prediction component 434 can generate one or more probability maps for vehicles, pedestrians, animals, and the like within a threshold distance from the vehicle 402. In some instances, the prediction component 434 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 436 can determine a path for the vehicle 402 to follow to traverse through an environment. For example, the planning component 436 can determine various routes and paths and various levels of detail. In some instances, the planning component 436 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 436 can generate an instruction for guiding the autonomous vehicle along at least a portion of the route from the first location to the second location. In at least one example, the planning component 436 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level can be selected to operate the vehicle.

In other examples, the planning component 436 can alternatively, or additionally, use data from the perception component 422 and/or the prediction component 434 to determine a path for the vehicle 402 to follow to traverse through an environment. For example, the planning component 436 can receive data from the perception component 422 and/or the prediction component 434 regarding objects associated with an environment. Using this data, the planning component 436 can determine a route to travel from a first location (e.g., a current location) to a second location (e.g., a target location) to avoid objects in an environment. In at least some examples, such a planning component 436 can determine there is no such collision free path and, in turn, provide a path which brings vehicle 402 to a safe stop avoiding all collisions and/or otherwise mitigating damage.

The memory 418 can further include one or more maps 438 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: covariance data (e.g., represented in a multi-resolution voxel space), texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 438 can include at least one map (e.g., images and/or a mesh). In some examples, the vehicle 402 can be controlled based at least in part on the map(s) 438. That is, the map(s) 438 can be used in connection with the localization component 420, the perception component 422 (and sub-components), the prediction component 434, and/or the planning component 436 to determine a location of the vehicle 402, identify objects in an environment, generate prediction probabilit(ies) associated with objects and/or the vehicle 402, and/or generate routes and/or trajectories to navigate within an environment.

In at least one example, the computing device 404 can include one or more system controller(s) 440, which can be configured to control steering, propulsion, braking, safety, emitters, communication, and other systems of the vehicle 402. These system controller(s) 440 can communicate with and/or control corresponding systems of the drive system(s) 414 and/or other components of the vehicle 402, which can be configured to operate in accordance with a path provided from the planning component 436.

The vehicle 402 can connect to computing device(s) 444 via network 442 and can include one or more processor(s) 446 and memory 448 communicatively coupled with the one or more processor(s) 446. In at least one instance, the one or more processor(s) 446 can be similar to the processor(s) 416 and the memory 448 can be similar to the memory 418. In the illustrated example, the memory 448 of the computing device(s) 444 stores a remote operation component 450 and/or a model component 452. In at least one instance, the model component 452, after empirical testing and/or simulations, can generate ML models to be used by the perception component 422, as discussed herein. Though depicted as residing in the memory 448 for illustrative purposes, it is contemplated that the remote operation component 450 and the model component 452 can additionally, or alternatively, be accessible to the computing device(s) 444 (e.g., stored in a different component of computing device(s) 444 and/or be accessible to the computing device(s) 444 (e.g., stored remotely).

The model component 452 can include functionality to generate models for determining heights/classifications of multi-channel image data, as discussed herein.

The processor(s) 416 of the computing device 404 and the processor(s) 446 of the computing device(s) 444 can be any suitable processor capable of executing instructions to process data and perform operations as described herein. By way of example and not limitation, the processor(s) 416 and 446 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 418 computing device 404 and the memory 448 of the computing device(s) 444 are examples of non-transitory computer-readable media. The memory 418 and 448 can store an operating system and one or more software applications, instructions, programs, and/or data to implement the methods described herein and the functions attributed to the various systems. In various implementations, the memory 418 and 448 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 418 and 448 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Figure 5:
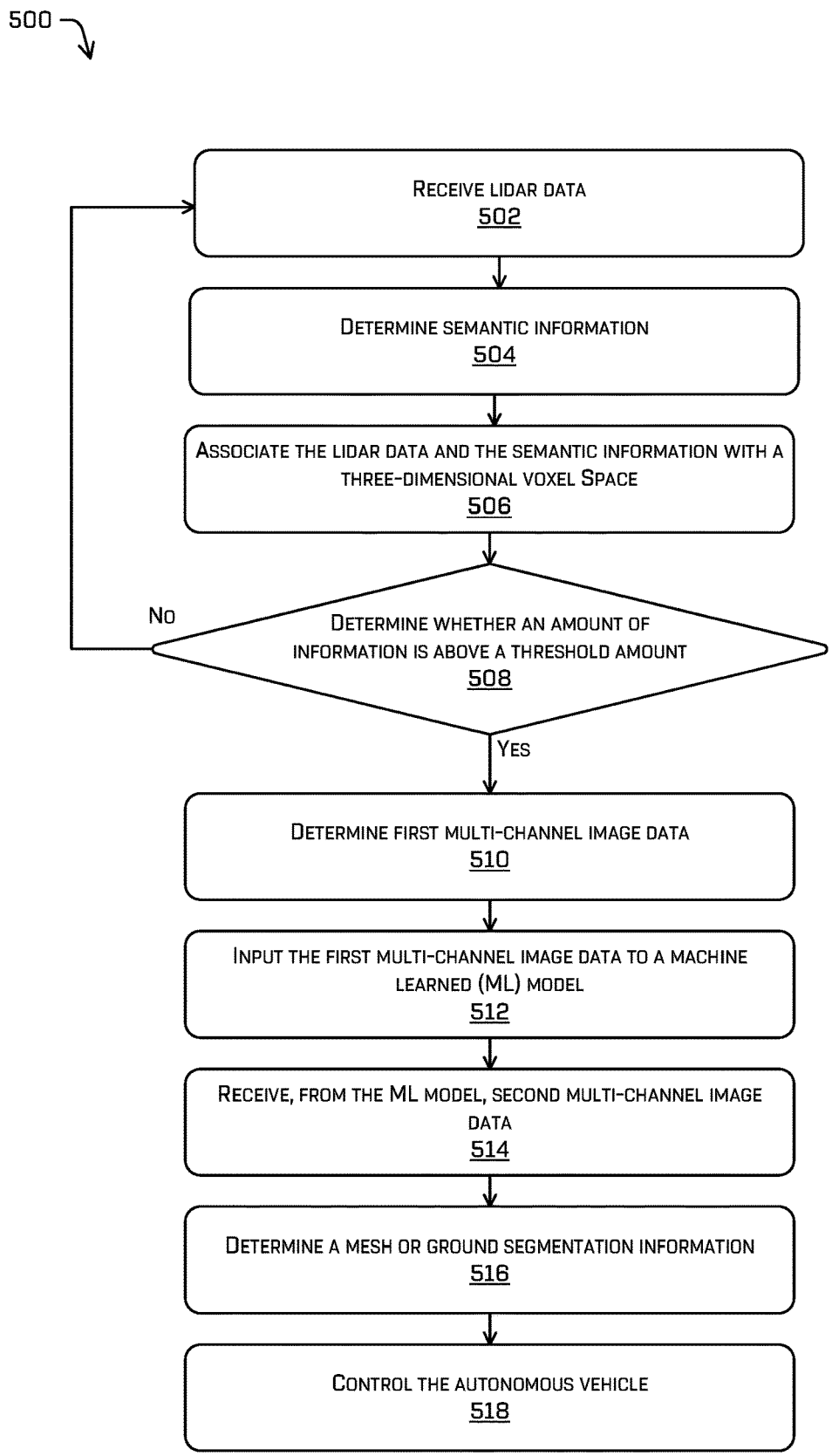
FIG. 5 is an example process for estimating a ground height and controlling a vehicle based at least in part on the ground height.

FIG. 5 is an example process for estimating a ground height and controlling a vehicle based at least in part on the ground height. For example, some or all of the process 500 can be performed by one or more components in FIG. 4, as described herein. For example, some or all of the process 500 can be performed by the perception component 422.

At operation 502, the process can include receiving lidar data. In some examples, the operation 502 can include receiving lidar data of an environment captured by a lidar sensor of an autonomous vehicle. The lidar data can be associated with various objects in the environment, such as cars, trucks, roads, buildings, bikes, pedestrians, etc. The lidar data can be accumulated over time.

At operation 504, the process can include determining semantic information. In some examples, the operation 504 can include determining semantic information associated with the lidar data. As described herein, semantic segmentation can be performed on a three-dimensional voxel space based on the lidar data. The semantic information can be utilized to determine multi-channel image data input into an ML model, to identify whether (or a probability associated with whether) a point in the three-dimensional voxel space is associated with the object or with the ground surface.

At operation 506, the process can include associating the lidar data and the semantic information with a three-dimensional voxel space. In some examples, the operation 506 can include, as data is accumulated over time, aligning a meta spin with the voxel space. Data associated with a current spin of the meta spin also can be associated with the voxel space. The semantic information can be associated with the lidar data and/or the voxel space.

At operation 508, the process can include determining whether an amount of information is above a threshold amount. By way of example, the amount of information can be determined to be above the threshold amount based on a number of points associated with the voxel space, voxel, column, or any region being above a threshold number. By way of another example, the operation 510 can include determining whether a number of points associated with a particular classification is above a threshold, or whether a probability of a classification of a point is above a threshold. The operation 508 can be performed on a per voxel basis, a per column basis, on the voxel space as a whole, etc. The process can subsequently include the operation 502 to restart the process, based on the amount of information being determined to be at or below the threshold amount.

At operation 510, the process can include determining first multi-channel image data. In some examples, the first multi-channel image data can be based at least in part on the three-dimensional voxel space. The first multi-channel image data can include a first region associated with feature data, as discussed herein. Each region of the first multi-channel image data can be associated with a column of the voxel space (or other region of the voxel space, such as a row of voxels, a number of columns, etc.). For example, three-dimensional information associated with the column can be converted to two-dimensional information associated with the region. Each region can include feature data. The features data can include (for lidar points associated with a column), but is not limited to, an average height, a maximum height, a minimum height, a covariance, reflectivity, surface normal, a number of lidar points, and the like.

At operation 512, the process can include inputting the first multi-channel image data to a machine learned (ML) model. In some examples, the operation 514 can include analyzing, by the ML model, the first multi-channel image data based on the semantic information and features, as discussed herein.

At operation 514, the process can include receiving, from the ML model, second multi-channel image data. However, image data received from the ML model is not limited to multi-channel image data and can be other types of image data (e.g., single-channel image data). In some examples, the operation 516 can include receiving, from the ML model, second multi-channel image data comprising a second region associated with the first region, the second region associated with height data and/or classification data. The ML mode can output the second multi-channel image data, based on a maximum height, a minimum height, an average height, a covariance, a surface normal, and/or a classification associated with the first region.

At operation 516, the process can include determining a mesh and/or ground segmentation information. In some examples, the operation 516 can include determining, based at least in part on the height data and the classification data, a mesh and/or the ground segmentation information associated with or otherwise representing a ground surface of the environment.

At operation 518, the process can include controlling the autonomous vehicle. In some examples, the operation 518 can include controlling the autonomous vehicle based at least in part on a mesh and/or ground segmentation information. The autonomous vehicle can be controlled to proceed along a planned route or trajectory based on clustering or segmenting object data based on the mesh and/or the ground segmentation information. The autonomous vehicle can be controlled to refrain from proceeding along the planned route or the trajectory based on an object height from ground being associated with an object other than the ground surface.

EXAMPLE CLAUSES

A. A system comprising: one or more processors; and one or more computer-readable media storing instructions executable by the one or more processors, wherein the instructions, when executed, cause the system to perform operations comprising: receiving lidar data of an environment captured by a lidar sensor of an autonomous vehicle; determining semantic information associated with the lidar data; associating the lidar data with a three-dimensional voxel space; associating the semantic information with the three-dimensional voxel space; determining, based at least in part on a portion of the three-dimensional voxel space, first multi-channel image data comprising feature data; inputting the first multi-channel image data to a machine learned (ML) model; receiving, from the ML model, second multi-channel image data comprising height data and classification data; determining, based at least in part on the height data and the classification data, a mesh associated with a ground surface of the environment; and controlling the autonomous vehicle based at least in part on the mesh.

B. The system of paragraph A, the operations further comprising: determining, as the feature data associated with the first region, at least one of: minimum height data; maximum height data; average height data; covariance data; or surface normal data.

C. The system of paragraph A or B, wherein the first multi-channel image data comprises a first two-dimensional layer associated with first feature data and a second two-dimensional layer associated with second feature data.

D. The system of any of paragraphs A-C, wherein the semantic information comprises a classification probability that a lidar point is associated with a drivable surface.

E. The system of any of paragraphs A-D, wherein determining the mesh associated with the ground surface comprises: determining a mesh vertex based at least in part on the height data associated with the second region; and determining a polygon based at least in part on the mesh vertex.

F: A method comprising: receiving lidar data of an environment captured by a lidar sensor of an autonomous vehicle; determining, based at least in part on the lidar data, multi-channel image data; inputting the multi-channel image data to a machine learned (ML) model; determining, based on output data received from the ML model, at least one of height data or classification data associated with a ground surface of the environment; and controlling the autonomous vehicle based on the at least one of the height data or the classification data.

G: The method of paragraph F, further comprising: associating the lidar data with a three-dimensional voxel space; determining, based at least in part on the lidar data, semantic information; associating the semantic information with the three-dimensional voxel space; and determining the multi-channel image data based at least in part on the three-dimensional voxel space.

H: The method of paragraph F or G, wherein the output data comprises a first layer associated with the height data and a second layer associated with the classification data.

I: The method of any of paragraphs F-H, further comprising: associating the lidar data with a three-dimensional voxel space; and determining a portion of the multi-channel image data based at least in part on a column of the three-dimensional voxel space.

J: The method of any of paragraphs F-I, further comprising: determining, based on the at least one of the height data or the classification data, second multi-channel image data; determining, for a point of the lidar data, a distance from a portion of the height data; and determining, based at least in part on the distance, that the point is associated with an object.

K: The method of any of paragraphs F-J, further comprising: determining a probability that a lidar point of the lidar data is associated with a ground surface of the environment, wherein the multi-channel image data comprises the probability.

L: The method of any of paragraphs F-K, further comprising: determining, based at least in part on the output data, a mesh associated with a ground surface of the environment.

M: One or more non-transitory computer-readable media storing instructions executable by a processor, wherein the instructions, when executed, cause the processor to perform operations comprising: receiving lidar data of an environment captured by a lidar sensor of an autonomous vehicle; determining, based at least in part on the lidar data, multi-channel image data; inputting the multi-channel image data to a machine learned (ML) model; determining, based on output data received from the ML model, at least one of height data or classification data associated with a ground surface of the environment; and controlling the autonomous vehicle based on the at least one of the height data and the classification data.

N. The one or more non-transitory computer-readable media of paragraph M, wherein the multi-channel image data comprises a first channel associated with first feature data and a second channel associated with second feature data.

O. The one or more non-transitory computer-readable media of paragraph M or N, further comprising: associating the lidar data with a three-dimensional voxel space; determining, based at least in part on the lidar data, semantic information; associating the semantic information with the three-dimensional voxel space; and determining the multi-channel image data based at least in part on the three-dimensional voxel space.

P. The one or more non-transitory computer-readable media of any of paragraphs M-O, wherein the output data comprises a first layer associated with the height data and a second layer associated with the classification data.

Q. The one or more non-transitory computer-readable media of any of paragraphs M-P, further comprising: associating the lidar data with a three-dimensional voxel space; and determining a portion of the multi-channel image data based at least in part on a column of the three-dimensional voxel space.

R. The one or more non-transitory computer-readable media of any of paragraphs M-Q, the operations further comprising: determining, based on the at least one of the height data or the classification data, second multi-channel image data; determining, for a point of the lidar data, a distance from a portion of the height data; and determining, based at least in part on the distance, that the point is associated with an object.

S. The one or more non-transitory computer-readable media of any of paragraphs M-R, the operations further comprising: determining a probability that a lidar point of the lidar data is associated with a ground surface of the environment, wherein the multi-channel image data comprises the probability.

T. The one or more non-transitory computer-readable media of any of paragraphs M-S, wherein the ML model is a first algorithm and is trained based at least in part on ground truth data, the ground truth data determined, based at least in part on at least one of map data, hand-annotated data, or sensor data input by the autonomous vehicle as the autonomous vehicle moves through the environment.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more computer-readable media storing instructions executable by the one or more processors, wherein the instructions, when executed, cause the system to perform operations comprising:
      receiving lidar data of an environment captured by a lidar sensor of an autonomous vehicle;
      determining semantic information associated with the lidar data;
      associating the lidar data with a three-dimensional voxel space;
      associating the semantic information with the three-dimensional voxel space;
      determining, based at least in part on a portion of the three-dimensional voxel space, first multi-channel image data comprising feature data;
      inputting the first multi-channel image data to a machine learned (ML) model;
      receiving, from the ML model, second multi-channel image data comprising height data and classification data;
      determining, based at least in part on the height data and the classification data, a mesh associated with a ground surface of the environment; and
      controlling the autonomous vehicle based at least in part on the mesh.

2. The system of claim 1, the operations further comprising:
   determining, as the feature data, at least one of:
      minimum height data;
      maximum height data;
      average height data;
      covariance data; or
      surface normal data.

3. The system of claim 1, wherein the first multi-channel image data comprises a first two-dimensional layer associated with first feature data and a second two-dimensional layer associated with second feature data.

4. The system of claim 1, wherein the semantic information comprises a classification probability that a lidar point is associated with a drivable surface.

5. The system of claim 1, wherein determining the mesh associated with the ground surface comprises:
   determining a mesh vertex based at least in part on the height data; and
   determining a polygon based at least in part on the mesh vertex.

6. A method comprising:
   receiving lidar data of an environment captured by a lidar sensor of an autonomous vehicle;
   determining, based at least in part on the lidar data, multi-channel image data;
   inputting the multi-channel image data to a machine learned (ML) model;
   determining, based on output data received from the ML model, ground surface height data and ground surface classification data; and
   controlling the autonomous vehicle based on the ground surface height data and the ground surface classification data.

7. The method of claim 6, further comprising:
   associating the lidar data with a three-dimensional voxel space;
   determining, based at least in part on the lidar data, semantic information;
   associating the semantic information with the three-dimensional voxel space; and
   determining the multi-channel image data based at least in part on the three-dimensional voxel space.

8. The method of claim 6, wherein the output data comprises a first layer associated with the ground surface height data and a second layer associated with the ground surface classification data.

9. The method of claim 6, further comprising:
   associating the lidar data with a three-dimensional voxel space; and
   determining a portion of the multi-channel image data based at least in part on a column of the three-dimensional voxel space.

10. The method of claim 6, further comprising:
    determining, based on the ground surface height data and the ground surface classification data, second multi-channel image data;
    determining, for a point of the lidar data, a distance from a portion of the ground surface height data; and
    determining, based at least in part on the distance, that the point is associated with an object.

11. The method of claim 6, further comprising:
determining a probability that a lidar point of the lidar data is associated with a ground surface of the environment,
wherein the multi-channel image data comprises the probability.

12. The method of claim 6, further comprising:
determining, based at least in part on the output data, a mesh associated with a ground surface of the environment.

13. One or more non-transitory computer-readable media storing instructions executable by a processor, wherein the instructions, when executed, cause the processor to perform operations comprising:
receiving lidar data of an environment captured by a lidar sensor of an autonomous vehicle;
determining, based at least in part on the lidar data, multi-channel image data;
inputting the multi-channel image data to a machine learned (ML) model;
determining, based on output data received from the ML model, ground surface height data and ground surface classification data; and
controlling the autonomous vehicle based on the ground surface height data and the ground surface classification data.

14. The one or more non-transitory computer-readable media of claim 13, wherein the multi-channel image data comprises a first channel associated with first feature data and a second channel associated with second feature data.

15. The one or more non-transitory computer-readable media of claim 13, further comprising:
associating the lidar data with a three-dimensional voxel space;
determining, based at least in part on the lidar data, semantic information;
associating the semantic information with the three-dimensional voxel space; and
determining the multi-channel image data based at least in part on the three-dimensional voxel space.

16. The one or more non-transitory computer-readable media of claim 13, wherein the output data comprises a first layer associated with the ground surface height data and a second layer associated with the ground surface classification data.

17. The one or more non-transitory computer-readable media of claim 13, further comprising:
associating the lidar data with a three-dimensional voxel space; and
determining a portion of the multi-channel image data based at least in part on a column of the three-dimensional voxel space.

18. The one or more non-transitory computer-readable media of claim 13, the operations further comprising:
determining, based on the ground surface height data and the ground surface classification data, second multi-channel image data;
determining, for a point of the lidar data, a distance from a portion of the ground surface height data; and
determining, based at least in part on the distance, that the point is associated with an object.

19. The one or more non-transitory computer-readable media of claim 13, the operations further comprising:
determining a probability that a lidar point of the lidar data is associated with a ground surface of the environment,
wherein the multi-channel image data comprises the probability.

20. The one or more non-transitory computer-readable media of claim 13, wherein the ML model is a first algorithm and is trained based at least in part on ground truth data, the ground truth data determined, based at least in part on at least one of map data, hand-annotated data, or sensor data input by the autonomous vehicle as the autonomous vehicle moves through the environment.

* * * * *